US012729621B2

(12) United States Patent
Holmes et al.

(10) Patent No.: US 12,729,621 B2
(45) Date of Patent: Sep. 8, 2026

(54) VISUALIZATION OF DIRECTIONAL INFLUENCE OF WELLS ON CORRELATION

(71) Applicant: Chevron U.S.A. Inc., San Ramon, CA (US)

(72) Inventors: Robert Chadwick Holmes, Houston, TX (US); Fabien J. Laugier, Houston, TX (US)

(73) Assignee: CHEVRON U.S.A. INC., San Ramon, CA (US)

(*) Notice: Subject to any disclaimer, the term of this patent is extended or adjusted under 35 U.S.C. 154(b) by 505 days.

(21) Appl. No.: 18/027,878

(22) PCT Filed: Nov. 10, 2021

(86) PCT No.: PCT/US2021/058819
§ 371 (c)(1),
(2) Date: Mar. 22, 2023

(87) PCT Pub. No.: WO2022/103863
PCT Pub. Date: May 19, 2022

(65) Prior Publication Data

US 2023/0366309 A1 Nov. 16, 2023

Related U.S. Application Data

(60) Provisional application No. 63/113,713, filed on Nov. 13, 2020.

(51) Int. Cl.
*E21B 47/026* (2006.01)
*E21B 49/00* (2006.01)
*G01V 1/34* (2006.01)

(52) U.S. Cl.
CPC ............ *E21B 47/026* (2013.01); *G01V 1/345* (2013.01); *E21B 49/00* (2013.01)

(58) Field of Classification Search
CPC ....... E21B 47/026; E21B 47/02; G01V 1/345; G01V 1/50
See application file for complete search history.

(56) References Cited

U.S. PATENT DOCUMENTS

| | | | |
|---|---|---|---|
| 7,126,340 | B1 | 10/2006 | Ameen |
| 9,279,323 | B2 | 3/2016 | Mullins |

(Continued)

FOREIGN PATENT DOCUMENTS

| | | |
|---|---|---|
| CN | 105389467 | 3/2016 |
| CN | 114880825 | 8/2022 |

(Continued)

OTHER PUBLICATIONS

Overbey, W. K., L. E. Yost, and A. B. Yost. "Analysis of natural fractures observed by borehole video camera in a horizontal well." In SPE Unconventional Resources Conference/Gas Technology Symposium, pp. SPE-17760. SPE, 1988 (Year: 1988).*

(Continued)

*Primary Examiner* — Douglas Kay
(74) *Attorney, Agent, or Firm* — Sheppard, Mullin, Richter & Hampton LLP

(57) ABSTRACT

A well may be selected from a group of wells. Multiple scenarios of boundary locations within the selected well may be determined based on propagation of boundaries from other wells to the selected well. A visual representation of the multiple scenarios of boundary locations within the selected well may be provided based on spatial arrangement of the wells within the group of wells. A visual representation of the spatial arrangement of the wells within the group of wells may be provided.

20 Claims, 7 Drawing Sheets

(56) References Cited

U.S. PATENT DOCUMENTS

| | | | | |
|---|---|---|---|---|
| 10,459,098 | B2 | 10/2019 | Grant | |
| 11,802,985 | B2 * | 10/2023 | Tian | G01V 1/306 |
| 2007/0027666 | A1 * | 2/2007 | Frankel | E21B 49/00 703/10 |
| 2007/0168133 | A1 | 7/2007 | Bennett | |
| 2012/0253770 | A1 | 10/2012 | Stern | |
| 2013/0261978 | A1 | 10/2013 | Xu | |
| 2014/0236549 | A1 | 8/2014 | Le Ravalec | |
| 2015/0035536 | A1 | 2/2015 | Tang | |
| 2018/0225778 | A1 | 8/2018 | Grant | |
| 2020/0356856 | A1 | 11/2020 | Moniruzzaman | |
| 2021/0048556 | A1 | 2/2021 | Sun | |
| 2021/0208302 | A1 | 7/2021 | Ma | |
| 2022/0120930 | A1 | 4/2022 | Kiselev | |
| 2023/0351079 | A1 | 11/2023 | Chadwick | |
| 2023/0399934 | A1 | 12/2023 | Holmes | |
| 2024/0061146 | A1 | 2/2024 | Holmes | |

FOREIGN PATENT DOCUMENTS

| | | | |
|---|---|---|---|
| WO | 2017135972 | 8/2017 | |
| WO | 2018164680 | 9/2018 | |
| WO | 2020185918 | 9/2020 | |
| WO | WO-2022103801 A1 * | 5/2022 | E21B 47/00 |

OTHER PUBLICATIONS

Persaud P, Pritchard EH, Stock JM. “Scales of stress heterogeneity near active faults in the Santa Barbara Channel, southern California.” Geochemistry, Geophysics, Geosystems. Jan. 2020;21(1):e2019GC008744 (Year: 2020).*

Sanderson DJ, Peacock DC. Making rose diagrams fit-for-purpose. Earth-Science Reviews. Feb. 1, 2020;201:103055 (Year: 2020).*

Dudley, Colton M. Integrating horizontal borehole imagery and cluster analysis with microseismic data for Niobrara/Codell reservoir characterization, Wattenberg Field, Colorado, USA. Colorado School of Mines, 2015 (Year: 2015).*

Zhou et al. A Stratigraphic Prediction Method Based on Machine Learning. Applied Sciences [online], pp. 1-29, Aug. 29, 2019 [retrieved on Jan. 10, 2022]. Retrieved from the Internet: <URL:https://www.mdpi.com/2076-3417/9/17/3553/pdf>, especially pp. 1-29. entire document.

PCT International Search Report and Written Opinion for PCT Application No. PCT/US2021/058730, mailed Feb. 7, 2022 (8 pages).

PCT International Search Report for Application No. PCT/US2021/058823, mailed Feb. 2, 2022 (8 pages).

PCT International Search Report and Written Opinion for PCT Application No. PCT/US2021/058835, mailed Feb. 4, 2022 (17 pages).

Florent Lallier et al: “Uncertainty assessment in the stratigraphic well correlation of a carbonate ramp: Method and application to the Beausset Basin, SE France”, Comptes Rendus Geoscience, Elsevier, Paris, FR, vol. 348, No. 7, Jan. 25, 2016 (Jan. 25, 2016), pp. 499-509, XP029757193.

I. Le Nir et al: “Cross-Section Construction From Automated Well Logcorrelation: A Dynamic Programming Approach Using Multiple Well Logs”, SPWLA 39th Annual Logging Symposium, May 1, 1998 (May 1, 1998), XP055327733, Retrieved from the Internet: URL:https://www.onepetro.org/download/conference-paper/SPWLA-1998-DDDid=conferencepaper/SPWLA-1998-DDD[retrieved on Dec. 9, 2016].

Madof Andrew S. et al: “Stratigraphic aliasing and the transient nature of deep-water depositional sequences: Revisiting the Mississippi Fan”, Geology, vol. 47, No. 6, Apr. 16, 2019 (Apr. 16, 2019) pp. 545-549, XP093179240.

PCT International Search Report and Written Opinion for PCT Application No. PCT/US2021/058819, mailed Feb. 7, 2022 (9 pages).

AU Examination Report from AU Application No. 2021377807 mailed Sep. 1, 2023 (3 pages).

AU Examination Report from AU Application No. 2021379607, mailed Aug. 31, 2023 (3 pages).

AU Examination Report from AU Application No. 2021380731 mailed Sep. 4, 2023 (4 pages).

* cited by examiner

400

500

600

FIG. 7
700
DEPTH
SCENARIO NUMBERS

VISUALIZATION OF DIRECTIONAL INFLUENCE OF WELLS ON CORRELATION

CROSS-REFERENCE TO RELATED APPLICATION

The present application is a national stage application of International Application No. PCT/US2021/058819, filed Nov. 10, 2021, which claims the benefit of U.S. Provisional Application No. 63/113,713, entitled "VISUALIZATION OF DIRECTIONAL INFLUENCE OF WELLS ON CORRELATION," which was filed on Nov. 13, 2020, the entirety of which is hereby incorporated herein by reference.

FIELD

The present disclosure relates generally to the field of visualizing directional influence of wells on correlation.

BACKGROUND

Well logs for a subsurface region may be analyzed to characterize the subsurface region. A key step in subsurface characterization is mapping directional trends in the well logs. However, manual analysis of directional trends in the well logs may be difficult, subjective, biased, and non-repeatable.

SUMMARY

This disclosure relates to visualizing directional influence of wells on correlation. Well information, boundary information, and/or other information may be obtained. The well information may define a group of wells within a region of interest. The group of wells may include multiple wells. The multiple wells may include a selected well. The boundary information may define scenarios of boundary locations within the selected well. Individual scenarios of boundary locations within the selected well may be determined based on propagation of boundaries of wells in the group of wells to the selected well and/or other information. One or more visual representations of the scenarios of boundary locations within the selected well may be provided based on spatial arrangement of the other wells with respect to the selected well and/or other information.

A system that visualizes directional influence of wells on correlation may include one or more electronic storage, one or more processors and/or other components. The electronic storage may store well information, information relating to wells, information relating to group of wells, information relating to region of interest, information relating to selected well, boundary information, information relating to scenarios of boundary locations, information relating to propagation of boundaries, information relating to visual representation of scenarios of boundary locations, information relating to spatial arrangement of wells, and/or other information.

The processor(s) may be configured by machine-readable instructions. Executing the machine-readable instructions may cause the processor(s) to facilitate visualizing directional influence of wells on correlation. The machine-readable instructions may include one or more computer program components. The computer program components may include one or more of a well information component, a boundary information component, a visual representation component, and/or other computer program components.

The well information component may be configured to obtain well information and/or other information. The well information may define a group of wells within a region of interest. The group of wells may include multiple wells. The multiple wells may include a selected well.

The boundary information component may be configured to obtain boundary information and/or other information. The boundary information may define scenarios of boundary locations within the selected well. Individual scenarios of boundary locations within the selected well may be determined based on propagation of boundaries of wells in the group of wells to the selected well and/or other information.

The visual representation component may be configured to provide one or more visual representations of the scenarios of boundary locations within the selected well. The visual representation(s) of the scenarios of boundary locations within the selected well may be provided based on spatial arrangement of the other wells with respect to the selected well and/or other information.

In some implementations, the visual representation component may be configured to provide one or more visual representations of the spatial arrangement of the other wells with respect to the selected well. In some implementations, the visual representation(s) of the spatial arrangement of the other wells with respect to the selected well may include a rose plot. The selected well may be positioned at a center of the rose plot. The other wells may be positioned around the center of the rose plot base on the spatial arrangement of the other wells with respect to the selected well and/or other information.

In some implementations, the rose plot may be divided into wedges of different color. Individual wedges may cover azimuthal ranges around the center of the rose plot. Size of the wedges may indicate number of the other wells that fall within the wedges. In some implementations, the individual wedges may cover azimuthal ranges of a user-specified number of degrees or desired resolution.

In some implementations, the visual representation(s) of the scenarios of boundary locations within the selected well may include a histogram plot. A first axis of the histogram plot may represent depths in the selected well and a second axis of the histogram plot may represent a number of the scenarios in which a boundary is located at a corresponding depth in the selected well.

In some implementations, the histogram plot may include a stacked histogram plot. Bars of the stacked histogram plot may have visually differentiated segments. The segments of the bars may correspond to the wedges in the rose plot. In some implementations, size of the segments of the bars may indicate the number of the scenarios, from wells in the corresponding wedges in the rose plot, in which the boundary is located at the corresponding depth in the selected well.

In some implementations, the histogram plot may include a conditional density plot. The conditional density plot may provide visualization of relative influence of the other wells in the different wedges in the rose plot on the boundary locations within the selected well.

In some implementations, the histogram plot may include azimuthal range histogram plots. Individual azimuthal range histogram plots may represent the number of the scenarios, from wells in the corresponding wedges in the rose plot, in which the boundary is located at the corresponding depth in the selected well.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to visualizing directional influence of wells on correlation. A well may be selected from a group of wells. Multiple scenarios of boundary locations within the selected well may be determined based on propagation of boundaries from other wells to the selected well. A visual representation of the multiple scenarios of boundary locations within the selected well may be provided based on spatial arrangement of the wells within the group of wells. A visual representation of the spatial arrangement of the wells within the group of wells may be provided.

Figure 1:
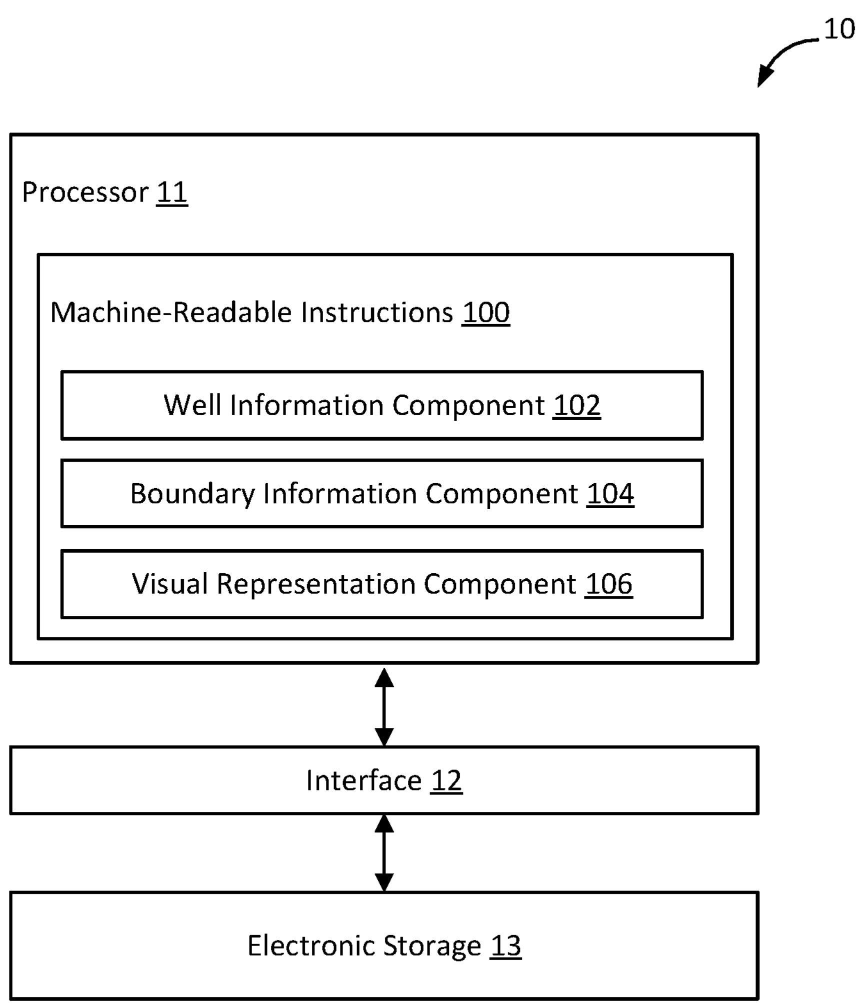
FIG. 1 illustrates an example system that visualizes directional influence of wells on correlation.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. Well information, boundary information, and/or other information may be obtained by the processor 11. The well information may define a group of wells within a region of interest. The group of wells may include multiple wells. The multiple wells may include a selected well. The boundary information may define scenarios of boundary locations within the selected well. Individual scenarios of boundary locations within the selected well may be determined based on propagation of boundaries of wells in the group of wells to the selected well and/or other information. One or more visual representations of the scenarios of boundary locations within the selected well may be provided by the processor 11 based on spatial arrangement of the other wells with respect to the selected well and/or other information.

Reservoir characterization from well data (e.g., well log data, well core data) is a key challenge in subsurface analysis. One of the critical limiting factors of manual well log interpretation is the inability to fully assess the spatial distribution of reservoir heterogeneity, which further precludes the ability to make predictions of reservoir properties away from drilled locations. A key step in subsurface characterization is mapping the directional trends that exist in well data. However, when performed manually, the trends are biased because the correlation between wells typically only follows a single path. As a result, the spectrum of trends that could exist by correlating wells along different paths, and the resulting spatial variability in rock property trends, is not fully assessed.

Present disclosure addresses these limitations by providing techniques to analyze/visualize directional influence of wells on correlation. The present disclosure enables rapid assessment of the uncertainty in the spatial variability of rock properties from well data. The techniques disclosed herein identify directional trends from a suite of well correlations. These trends may reflect changes due to structure (e.g. separate fault blocks impacting correlation results) or stratigraphy (e.g. sediment input from a certain area not seen from other directions). The techniques disclosed herein enable the assessment of the variability in subsurface heterogeneity, such as determination from which direction/location well log patterns/heterogeneity boundaries are being recognized. Such information enables geoscientists to make more informed decisions regarding a subsurface region, such as identifying optimal reservoir targets and resource density, identifying drilling locations, and optimizing development strategies.

Referring back to FIG. 1, the electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store well information, information relating to wells, information relating to group of wells, information relating to region of interest, information relating to selected well, boundary information, information relating to scenarios of boundary locations, information relating to propagation of boundaries, information relating to visual representation of scenarios of boundary locations, information relating to spatial arrangement of wells, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate visualizing directional influence of wells on correlation. The machine-readable instructions 100 may include one or more computer program components. The machine-readable instructions 100 may include one or more of a well information component 102, a boundary information component 104, a visual representation component 106, and/or other computer program components.

The well information component 102 may be configured to obtain well information and/or other information. Obtaining well information may include one or more of accessing, acquiring, analyzing, creating, determining, examining, generating, identifying, loading, locating, opening, receiving, retrieving, reviewing, selecting, storing, utilizing, and/or otherwise obtaining the well information. The well information component 102 may obtain well information from one or more locations. For example, the well information component 102 may obtain well information from a storage location, such as the electronic storage 13, electronic storage of a device accessible via a network, and/or other locations.

The well information component 102 may obtain well information from one or more hardware components (e.g., a computing device, a component of a computing device) and/or one or more software components (e.g., software running on a computing device). Well information may be stored within a single file or multiple files.

Figure 3:
FIG. 3 illustrates an example group of wells.
Figure 3:

The well information may define a group of wells within a region of interest. The well information may define a group of wells by defining one or more characteristics of the group of wells. For example, the well information may define subsurface configuration of wells within a group of wells. A region of interest may refer to a region of earth that is of interest in correlating wells and/or analyzing directional influence of wells on correlation. For example, a region of interest may refer to a subsurface region (a part of earth located beneath the surface/located underground) for which well correlation and/or anomaly detection is desired to be performed. A group of wells may refer to wells that are located within the region of interest. A group of wells may refer to some or all of the wells that are located within the region of interest. In some implementations, a group of wells may include wells that are representative of the region of interest. FIG. 3 illustrates an example group of wells 300. Individual dots/circles in the group of wells 300 may represent a well in the region of interest.

Subsurface configuration of a well may refer to attribute, quality, and/or characteristics of the well. Subsurface configuration of a well may refer to type, property, and/or physical arrangement of materials (e.g., subsurface elements) within the well and/or surrounding the well. Examples of subsurface configuration may include types of subsurface materials, characteristics of subsurface materials, compositions of subsurface materials, arrangements/configurations of subsurface materials, physics of subsurface materials, and/or other subsurface configuration. For instance, subsurface configuration may include and/or define types, shapes, and/or properties of materials and/or layers that form subsurface (e.g., geological, petrophysical, geophysical, stratigraphic) structures. In some implementations, subsurface configuration of a well may be defined by values of one or more subsurface properties as a function of position within the well. A subsurface property may refer to a particular attribute, quality, and/or characteristics of the well.

The well information may define a group of wells by including information that describes, delineates, identifies, is associated with, quantifies, reflects, sets forth, and/or otherwise defines one or more of content, quality, attribute, feature, and/or other aspects of the group of wells. For example, the well information may define a well by including information that makes up the content of the well and/or information that is used to identify/determine the content of the wells.

In some implementations, the well information may include one or more well logs and/or associated information for the individual wells in the group of wells. The well information may include a single well log or a suite of well logs for individual wells in the group of wells. For instance, the well information may include one or more well logs (of natural well, of virtual well), information determined/extracted from one or more well logs (e.g., of natural well, or virtual well), information determined/extracted from one or more well cores (e.g., of natural well, or virtual well), and/or other information. For example, the well information may include one or more well logs relating to one or more properties of a well, such as rock types, layers, grain sizes, porosity, and/or permeability of the well at different positions within the well. Other types of well information are contemplated.

In some implementations, the well log(s) for the individual wells may be normalized based on a log scaling and/or other information. Individual well logs may be normalized to themselves. The type of normalization that is performed may depend on the scale of the well log. For example, linearly-scaled logs (e.g., gamma ray logs) may be normalized from value of zero to one based on threshold upper and lower quantiles. Non-linearly-scaled logs (e.g., deep resistivity logs) may be transformed/approximated to linear space, and then normalized from value of zero to one by the same/similar means. In some implementations, Gaussian transformation may be applied to a well log to change the distribution of values within a target interval.

Normalization of the well logs may prepare the well logs for Continuous Wavelet Transform (CWT). The CWT may be performed on the normalized well logs based on an array of blocking windows (operator widths), and/or other information. The CWT may generate a multi-dimensional array of results.

A group of wells may include multiple wells. The multiple wells may include a selected well. One of the wells from the group of wells may be selected as the selected well. The selected well may refer to a well for which directional influence analysis is performed. Directional influence of other wells in the region of interest on the selected well may be analyzed. Directional influence of other wells in the region of interest on the selected well may be visualized. For example, the selected well may be centered on a rose plot that visually represents the spatial arrangement of other wells in the region of interest to the selected well. In some implementations, a well may be selected from the group of wells by a user. For example, a user may choose a particular well to be the selected well, such as by entering information associated with the well (e.g., entering the well identifier through a text interface) or selecting a well from a visualization of the group of wells (e.g., selecting a well from a map showing the group of wells). Other selections of well are contemplated.

The boundary information component 104 may be configured to obtain boundary information and/or other information. Obtaining boundary information may include one or more of accessing, acquiring, analyzing, creating, determining, examining, generating, identifying, loading, locating, opening, receiving, retrieving, reviewing, selecting, storing, utilizing, and/or otherwise obtaining the boundary information. The boundary information component 104 may obtain boundary information from one or more locations. For example, the boundary information component 104 may obtain boundary information from a storage location, such as the electronic storage 13, electronic storage of a device accessible via a network, and/or other locations. The boundary information component 104 may obtain boundary information from one or more hardware components (e.g., a computing device, a component of a computing device) and/or one or more software components (e.g., software running on a computing device). Boundary information may be stored within a single file or multiple files.

The boundary information may define scenarios of boundary locations within the selected well. The boundary information may define scenarios of boundary locations within the selected well by defining one or more characteristics of the scenarios of boundary locations within the selected well. The boundary information may define a scenario of boundary locations within the selected well by including information that describes, delineates, identifies, is associated with, quantifies, reflects, sets forth, and/or otherwise defines one or more of property, quality, attribute, feature, and/or other aspects of the scenario of boundary locations within the selected well. For example, the boundary information may define a scenario of boundary locations within the selected well by including information that specifies number and/or locations of boundaries within the selected well within the scenario of boundary location and/or information that is used to determine number and/or locations of boundaries within the selected well within the scenario of boundary location. Other types of boundaries information are contemplated.

A boundary within a well may refer to a feature and/or a place (e.g., in time, space) within the well that separate two distinct segments/packages of the well. A boundary location may refer to location of the boundary within the well. Boundary locations may be defined in terms of geologic space and/or geologic time. A scenario of boundary locations within the selected well refer to a set of potential locations of boundaries within the selected well. A scenario of boundary locations within the selected well may be determined based on the subsurface configuration of the selected well, the subsurface configuration of one or more other wells in the group of wells, and/or other wells.

For example, individual scenarios of boundary locations within the selected well may be determined based on propagation of boundaries of wells in the group of wells to the selected well. A single scenario of boundary locations within the selected well may be determined based on propagation of boundaries of one well in the group of wells to the selected well. The well in the group from which the boundaries are propagated to the selected well may be referred to as a source well. A single scenario of boundary locations within the selected well may be determined by identifying boundary locations within the source well, and propagating the boundary locations within the source well to the selected well. The identification and propagation of the boundary locations from the source well to the selected well may be repeated for different wells within the group of wells. For example, each well in the group of wells may be a source well for separate determination of scenarios of boundary locations within the selected well.

In some implementations, scenarios of boundary locations within the selected well may be determined based on alignment of wells in the group of wells. Determination of a scenario of boundary locations within the selected well may include: (1) identification of boundaries within the source well, (2) generation of branching well paths connecting the group of wells through the source well, where the origin of the branching well paths is located at the source well, (3) identification of a shortest path between the source well and the group of wells along the branching well paths, (4) alignment of the group of wells along the shortest path in a global "Relative Geologic Time" (RGT) solution, and (5) propagation of the boundaries of the source well to the aligned group of wells such that the boundaries of the source well are pushed/copied to the selected well aligned in the RGT space. Propagation of the boundaries of the source well to the selected well aligned in the RGT space may establish correlation between the source well to the selected well. The boundary locations within the selected well may be converted from the RGT space to true depth (e.g., in real space/in time). In some implementations, scenarios of boundary locations within the selected well may be determined based on propagation of the boundary locations from other wells to the selected well as described in PCT Application No. PCT/US21/58730, entitled "WELL CORRELATION THROUGH INTERMEDIARY WELL," which was filed on Nov. 10, 2021, the entirety of which is hereby incorporated herein by reference.

The visual representation component 106 may be configured to provide one or more visual representations of the scenarios of boundary locations within the selected well. A visual representation of a scenario of boundary locations within the selected well may refer to depiction of the scenario of boundary location in a visual form. A visual representation of a scenario of boundary locations within the selected well may visually provide information relating to directional influence of other wells in the region of interest on the selected well. A visual representation of a scenario of boundary locations within the selected well may facilitate understanding of from which directions the boundary locations were propagated to the selected well.

The visual representation(s) of the scenarios of boundary locations within the selected well may be provided by the visual representation component 106 based on spatial arrangement of the other wells with respect to the selected well and/or other information. Spatial arrangement of the other wells with respect to the selected well may refer to physical arrangement of the other wells with respect to the selected well within the region of interest. Spatial arrangement of the other wells with respect to the selected well may refer to distance between the other wells and the selected well and/or direction to the other wells from the selected. The visual representation(s) of the scenarios of boundary locations within the selected well may be provided based on the spatial arrangement of the other wells with respect to the selected well to visually provide information on the directional influence of other wells in the region of interest on the selected well.

In some implementations, the visual representation component 106 may be configured to provide one or more visual representations of the spatial arrangement of the other wells with respect to the selected well. That is, the visual representation component 106 may be configured to provide visualization of the spatial arrangement of the other wells with respect to the selected well.

Figure 4:
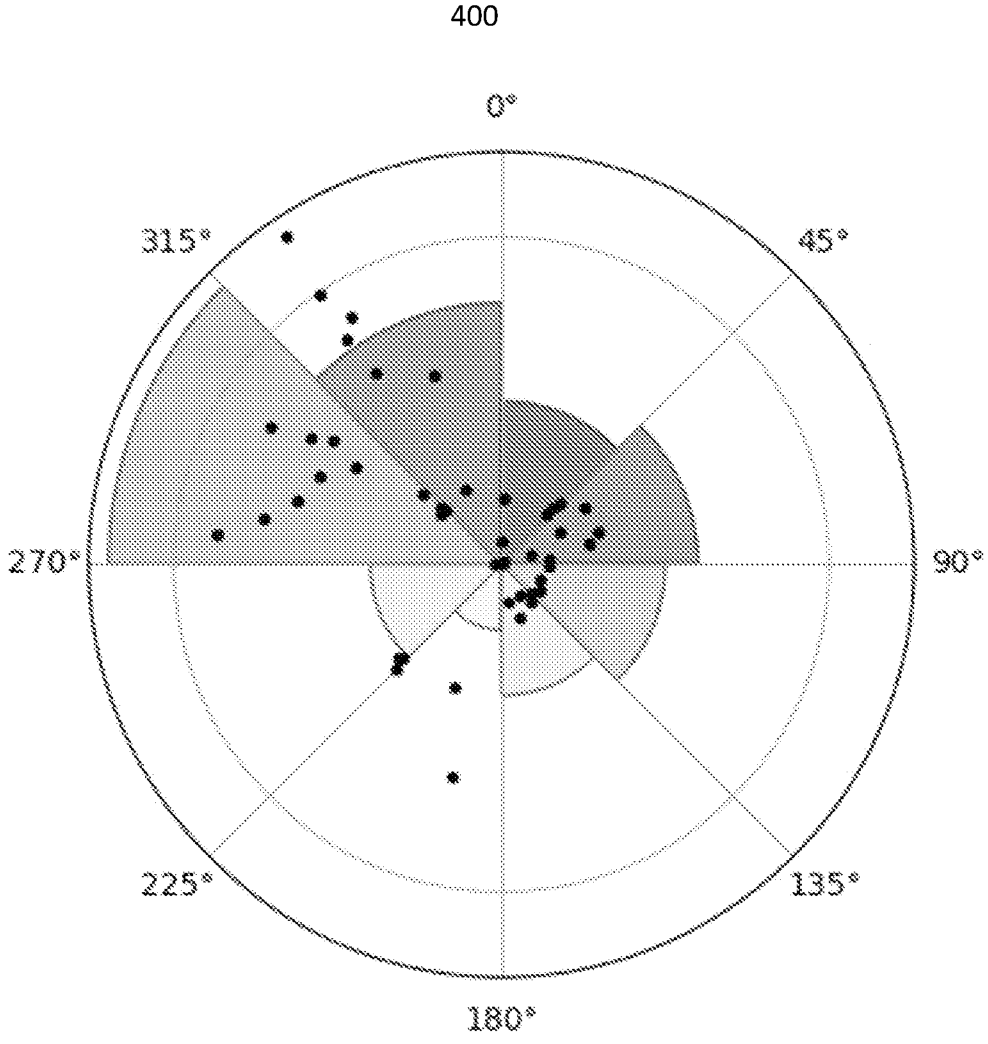
FIG. 4 illustrates an example rose plot.

In some implementations, the visual representation(s) of the spatial arrangement of the other wells with respect to the selected well may include one or more rose plots. The selected well may be positioned at a center of a rose plot. The other wells may be positioned around the center of the rose plot base on the spatial arrangement of the other wells with respect to the selected well and/or other information. The other wells may be distributed within the rose plot to show relative positions of the other wells with respect to the selected well. FIG. 4 illustrates an example rose plot 400. The rose plot 400 may include dots that represent the wells within the region of interest. The center of the rose plot 400 may include a dot that represent the selected well. Other wells in the group of wells may be positioned within the rose plot 400 based on where those wells are located with respect to the selected well.

In some implementations, the rose plot may be generated based on conversion of Cartesian (X, Y) location of wells in the group of wells to polar coordinates using the X,Y location of the selected well. The Cartesian-to-polar coordinate conversion may result in an azimuth angle and radius value for other wells relative to the selected well. The azimuth angles of the wells may be combined into a set of bins that cover circular range of 0-360 degrees. Width of the bins may be set/modified (e.g., automatically based on desired resolution, manually from user input) to control the scales of analysis from coarser scale (large angle range per bin) to finer scale (smaller angle range per bin). For example, a bin width of 90 degrees may result in a total of 4 bins that capture azimuth angles from 0-90 degrees, 90-180 degrees, 180-270 degrees, and 270-360 degrees.

The azimuthal distribution of the wells may be shown on the rose plot as wedges of different color (or other visual characteristics, such as brightness, pattern, etc.). That is, the rose plot may be divided into wedges of different color, with individual wedges covering azimuthal ranges around the center of the rose plot. For example, the rose plot may be divided into eight wedges, with individual wedges covering azimuthal ranges of 45 degrees. Other number of wedges and other azimuthal ranges are contemplated. In some implementations, individual wedges may cover azimuthal ranges of a user-specified number of degrees or desired resolution. Size (e.g., length of the wedge from the center of the rose plot) of the wedges may indicate number of the other wells that fall within the wedges/corresponding azimuthal ranges/bins.

For example, referring back to FIG. 4, the rose plot 400 may include a scatter plot of the wells in the region of interest, with the dots representing the wells positioned based on their polar coordinates. The azimuth angles of the dots may correspond to the azimuth angles between the selected well and the wells represented by the dots. The radius of the rose plot 400 may be scaled based on the maximum distance between the selected well and the other wells. The distance between the center of the rose plot 400 and the dots may correspond to the scaled distance between the selected wells and the wells represented by the dots. Such visualization of the spatial arrangement of the other wells with respect to the selected well provides direction and distance context for the group of wells.

The rose plot 400 may be divided into eight wedges, with individual wedges covering azimuthal ranges of 45 degrees. The size of the wedges (how far the wedge protrudes from the center of the rose plot 400) may indicate the number of wells that fall within the wedges/corresponding ranges/bins. For instance, in FIG. 4, the largest number of wells may be located within the wedge for azimuthal range 270-315 and may result in the corresponding wedge being the largest wedge, while the smaller number of wells may be located within the wedge for azimuthal range 180-225 and may result in the corresponding wedge being the smallest wedge. The wedges may have different visual characteristics (e.g., color, brightness, pattern) to distinguish different azimuthal ranges of the wedges.

In some implementations, the visual representation(s) of the scenarios of boundary locations within the selected well may include one or more histogram plots. Different axes of a histogram plot may represent (1) depths of the selected well and (2) number of scenarios in which a boundary is located at the corresponding depth in the selected well. A histogram plot may provide visualization of numbers of scenarios (e.g., correlation scenarios) in which boundary locations are identified at different depths of the selected well. A histogram plot may show how boundary locations change based on directional influence. A histogram plot may show how correlation from a subgroup of wells from one direction may identify boundary locations (and associated segmentation of well/well logs) in the selected well, while another subgroup of wells from another direction may not identify same/similar boundary locations. Thus directional influence may have implication on the structure and/or stratigraphy between the selected wells and other wells in the group of wells.

In some implementations, the histogram plot(s) may include a stacked histogram plot. A stacked histogram plot may show, for different depths of the selected wells, bars that represent numbers of scenarios in which a boundary location is determined for the different depths. Bars of the stacked histogram plot may have segments corresponding to the wedges/different azimuthal ranges of the rose plot. The segments of the bars may have visual characteristic (e.g., color, brightness, pattern) that matches the visual characteristic of the wedges in the rose plot. The size of the segments of the bars may indicate the number of the scenarios, from wells in the corresponding wedges, in which the boundary is determined to be located at the corresponding depth in the selected well.

Figure 5:
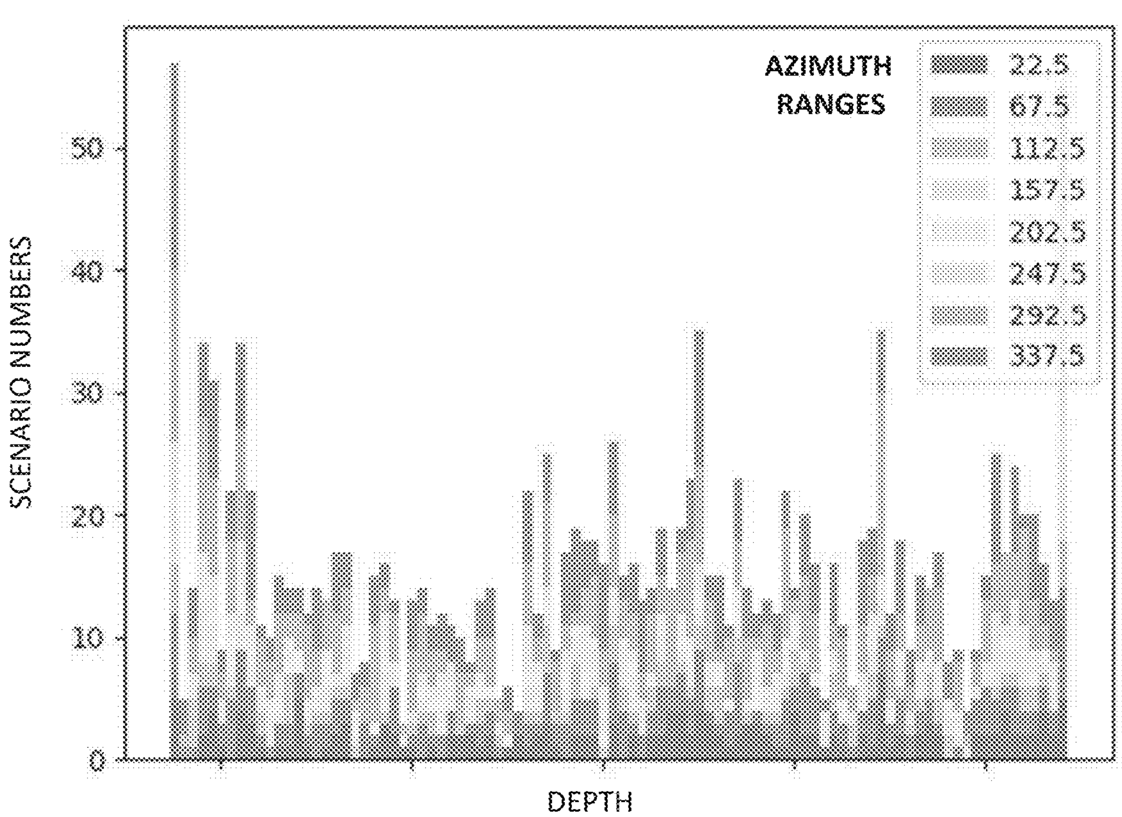
FIG. 5 illustrates an example stacked histogram plot.

For example, FIG. 5 illustrates an example stacked histogram plot 500. The X-axis of the stacked histogram plot 500 may represent depths of the selected well and the Y-axis of the stacked histogram plot 500 may represent number of scenarios in which a boundary is located at the corresponding depth in the selected well. The bars of the stacked histogram plot 500 may have segments of different color/brightness/pattern to indicate from which azimuthal range(s) the boundary location at the corresponding depth was propagated to the selected well. For example, the segments may be colored with the color of the corresponding wedges in the rose plot 400 in FIG. 4, with the wedges labeled according to the center of the azimuthal ranges. Taller bars may indicate depths at which boundary location is determined within the selected well in more scenarios, and shorter bars may indicate depth at which boundary location is determined within the selected well in fewer scenarios. The height of the bars may indicate how often boundary location was determined at the corresponding depth in the selected well, while the color of the segments may indicate direction from which those boundary locations were propagated.

In some implementations, the histogram plot(s) may include a conditional density plot. The conditional density plot may provide visualization of relative influence of the other wells in the different wedges in the rose plot (e.g., the rose plot 400) on the boundary locations within the selected well. The conditional density plot may visualize relative importance of wells (in different azimuthal ranges around the selected well) on determination of boundary locations at different depths in the selected well. In the conditional density plot, variation in the number of scenarios (with boundary location determined at corresponding depths in the selected well) may be eliminated to make the relative proportions of boundaries from different directions more apparent than the stacked histogram plot.

Figure 6:
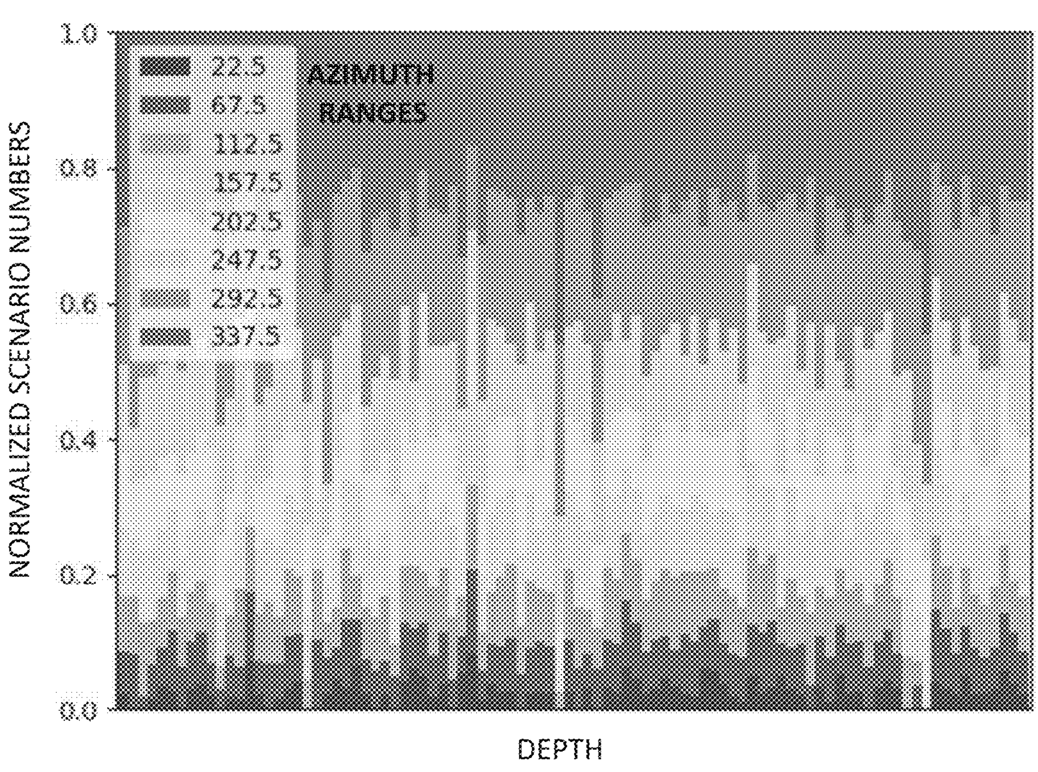
FIG. 6 illustrates an example conditional density histogram plot.

For example, FIG. 6 illustrates an example conditional density histogram plot 600. The conditional density histogram plot 600 may provide a normalized version of the information in the stacked histogram plot 500. The number of scenarios in which a boundary is located at the corresponding depth in the selected well may be normalized between zero and one in the conditional density histogram plot 600. The conditional density histogram plot 600 may allow for comparison analysis between different directions around the selected well in where boundary locations are propagated in the selected well.

In some implementations, the histogram plot(s) may include azimuthal range histogram plots. Individual azimuthal range histogram plots may represent the number of the scenarios, from wells in corresponding wedges in the rose plot (e.g., the rose plot 400), in which the boundary is located at the corresponding depth in the selected well. The azimuthal range histogram plots may separate the bars of the histograms based on the wedges/azimuth bins of the rose plot. The differences in the histograms may indicate how boundary locations within the selected well were determined differently for wells from different directions/azimuthal ranges. The differences in the histograms may indicate differences in how the selected well was segmented by correlation of the selected well with wells from different directions/azimuthal ranges. The differences in the histograms may show the directional dependence of boundary locations within the selected well.

Figure 7:
FIG. 7 illustrates example azimuthal range histogram plots

FIG. 7 illustrates example azimuthal range histogram plots 700. The azimuthal range histogram plots 700 may include eight different histogram plots based on eight wedges in the rose plot 400, with individual histogram plots corresponding to a wedge of the rose plot 400 covering azimuthal range of 45 degrees. The azimuthal range histogram plots 700 may show how wells in different directions (azimuthal ranges) contributed to boundary location determination within the selected well. Other visual representations of the scenarios of boundary locations within the selected well are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
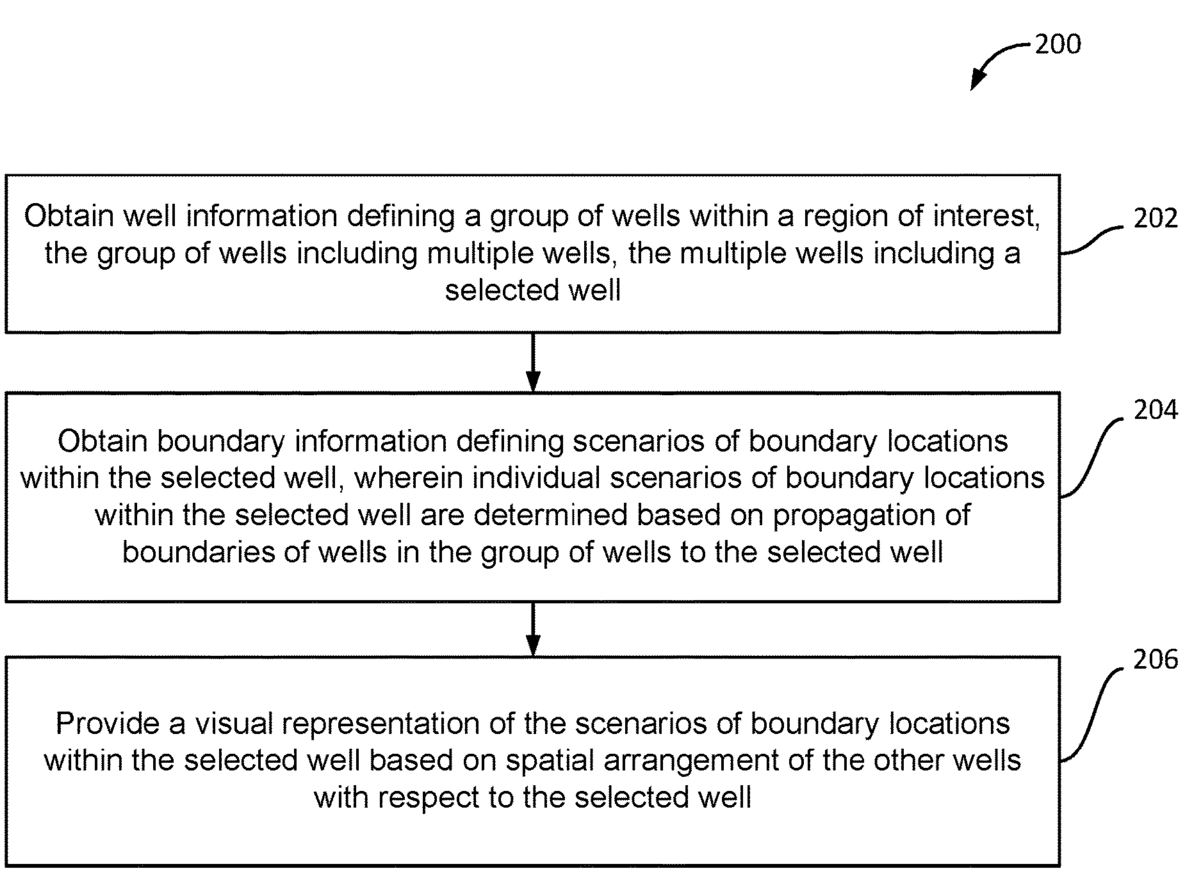
FIG. 2 illustrates an example method for visualizing directional influence of wells on correlation.

FIG. 2 illustrates method 200 for visualizing directional influence of wells on correlation. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, well information, and/or other information may be obtained. The well information may define a group of wells within a region of interest. The group of wells may include multiple wells. The multiple wells may include a selected well. In some implementations, operation 202 may be performed by a processor component the same as or similar to the well information component 102 (Shown in FIG. 1 and described herein).

At operation 204, boundary information, and/or other information may be obtained. The boundary information may define scenarios of boundary locations within the selected well. Individual scenarios of boundary locations within the selected well may be determined based on propagation of boundaries of wells in the group of wells to the selected well and/or other information. In some implementations, operation 204 may be performed by a processor component the same as or similar to the boundary information component 104 (Shown in FIG. 1 and described herein).

At operation 206, one or more visual representations of the scenarios of boundary locations within the selected well may be provided based on spatial arrangement of the other wells with respect to the selected well and/or other information. In some implementations, operation 206 may be performed by a processor component the same as or similar to the visual representation component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for visualizing directional influence of wells on linkage of geologic sections in different wells, the system comprising:

one or more physical processors configured by machine-readable instructions to:

obtain well information, the well information defining a group of wells within a region of interest, the group of wells including multiple wells, the multiple wells including a selected well, a first well, and a second well;

obtain boundary information, the boundary information defining different scenarios of boundary locations within the selected well, a given boundary including a geologic feature within a given well that separates two distinct geologic sections in the given well, a given boundary location including a location of the given boundary within the given well, a given scenario including a set of potential boundary locations within the given well from extension of boundaries in another well to the given well, wherein the different scenarios of boundary locations within the selected well are determined by extending boundaries of different ones of the wells in the group of wells to the selected well, further wherein a first scenario of boundary locations within the selected well is determined by extending boundaries of the first well to the selected well and a second scenario of boundary locations within the selected well is determined by extending boundaries of the second well to the selected well; and provide a visual representation of the different scenarios of boundary locations within the selected well based on spatial arrangement of the other wells with respect to the selected well, the visual representation of the different scenarios of boundary locations within the selected well visually indicating directional influence of the other wells on locations of boundaries extended to the selected well in the different scenarios of boundary locations, the visual representation of the different scenarios of boundary locations including visual elements that indicate from which directions the locations of boundaries within the selected well were extended.

2. The system of claim 1, wherein the one or more physical processors are further configured by the machine-readable instructions to provide a visual representation of the spatial arrangement of the other wells with respect to the selected well.

3. The system of claim 2, wherein:

the visual representation of the spatial arrangement of the other wells with respect to the selected well includes a rose plot;

the selected well is positioned at a center of the rose plot; and the other wells are positioned around the center of the rose plot based on the spatial arrangement of the other wells with respect to the selected well.

4. The system of claim 3, wherein the rose plot is divided into wedges of different color, individual wedges covering azimuthal ranges around the center of the rose plot, size of the wedges indicating number of the other wells that fall within the wedges.

5. The system of claim 4, wherein the individual wedges cover azimuthal ranges of a user-specified number of degrees or desired resolution.

6. The system of claim 4, wherein the visual representation of the different scenarios of boundary locations within the selected well includes a histogram plot, a first axis of the histogram plot representing depths in the selected well and a second axis of the histogram plot representing a number of the scenarios in which a boundary is located at a corresponding depth in the selected well.

7. The system of claim 6, wherein the histogram plot includes a stacked histogram plot, bars of the stacked histogram plot having visually differentiated segments, the segments corresponding to the wedges in the rose plot.

8. The system of claim 7, wherein size of the segments of the bars indicates the number of the scenarios, from wells in the corresponding wedges in the rose plot, in which the boundary is located at the corresponding depth in the selected well.

9. The system of claim 6, wherein the histogram plot includes a conditional density plot, the conditional density plot providing visualization of relative influence of the other wells in the different wedges in the rose plot on the boundary locations within the selected well.

10. The system of claim 6, wherein the histogram plot includes azimuthal range histogram plots, individual azimuthal range histogram plots representing the number of the scenarios, from wells in corresponding wedges in the rose plot, in which the boundary is located at the corresponding depth in the selected well.

11. A method for visualizing directional influence of wells on linkage of geologic sections in different wells, the method comprising:

obtaining well information, the well information defining a group of wells within a region of interest, the group of wells including multiple wells, the multiple wells including a selected well, a first well, and a second well;

obtaining boundary information, the boundary information defining different scenarios of boundary locations within the selected well, a given boundary including a geologic feature within a given well that separates two distinct geologic sections in the given well, a given boundary location including a location of the given boundary within the given well, a given scenario including a set of potential boundary locations within the given well from extension of boundaries in another well to the given well, wherein the different scenarios of boundary locations within the selected well are determined by extending boundaries of different ones of the wells in the group of wells to the selected well, further wherein a first scenario of boundary locations within the selected well is determined by extending boundaries of the first well to the selected well and a second scenario of boundary locations within the selected well is determined by extending boundaries of the second well to the selected well; and providing a visual representation of the different scenarios of boundary locations within the selected well based on spatial arrangement of the other wells with respect to the selected well, the visual representation of the different scenarios of boundary locations within the selected well visually indicating directional influence of the other wells on locations of boundaries extended to the selected well in the different scenarios of boundary locations, the visual representation of the different scenarios of boundary locations including visual elements that indicate from which directions the locations of boundaries within the selected well were extended.

12. The method of claim 11, further comprising providing a visual representation of the spatial arrangement of the other wells with respect to the selected well.

13. The method of claim 12, wherein:

the visual representation of the spatial arrangement of the other wells with respect to the selected well includes a rose plot;

the selected well is positioned at a center of the rose plot; and the other wells are positioned around the center of the rose plot based on the spatial arrangement of the other wells with respect to the selected well.

14. The method of claim 13, wherein the rose plot is divided into wedges of different color, individual wedges covering azimuthal ranges around the center of the rose plot, size of the wedges indicating number of the other wells that fall within the wedges.

15. The method of claim 14, wherein the individual wedges cover azimuthal ranges of a user-specified number of degrees or desired resolution.

16. The method of claim 14, wherein the visual representation of the different scenarios of boundary locations within the selected well includes a histogram plot, a first axis of the histogram plot representing depths in the selected well and a second axis of the histogram plot representing a number of the scenarios in which a boundary is located at a corresponding depth in the selected well.

17. The method of claim 16, wherein the histogram plot includes a stacked histogram plot, bars of the stacked histogram plot having visually differentiated segments, the segments corresponding to the wedges in the rose plot.

18. The method of claim 17, wherein size of the segments of the bars indicates the number of the scenarios, from wells in the corresponding wedges in the rose plot, in which the boundary is located at the corresponding depth in the selected well.

19. The method of claim 16, wherein the histogram plot includes a conditional density plot, the conditional density plot providing visualization of relative influence of the other wells in the different wedges in the rose plot on the boundary locations within the selected well.

20. The method of claim 16, wherein the histogram plot includes azimuthal range histogram plots, individual azimuthal range histogram plots representing the number of the scenarios, from wells in corresponding wedges in the rose plot, in which the boundary is located at the corresponding depth in the selected well.

* * * * *